A. D. RAY.
OIL BOLT.
APPLICATION FILED DEC. 18, 1916.

1,271,768.

Patented July 9, 1918.

Inventor
Albert D Ray
By Brockett and Hyde
Attys.

UNITED STATES PATENT OFFICE.

ALBERT D. RAY, OF CLEVELAND, OHIO.

OIL-BOLT.

1,271,768. Specification of Letters Patent. Patented July 9, 1918.

Application filed December 18, 1916. Serial No. 137,617.

*To all whom it may concern:*

Be it known that I, ALBERT D. RAY, citizen of the United States, residing at Cleveland, in the county of Cuyahoga and State of Ohio, have invented certain new and useful Improvements in Oil-Bolts, of which the following is a specification.

This invention relates to oil bolts, or, in other words, to bolts provided with means for supplying lubricating oil to the parts to which they are connected. Such bolts may be used to connect any parts having motion relative to each other or to the bolt, and are particularly useful for the springs of motor vehicles, steering knuckles, and other parts requiring frequent or continuous lubrication.

The objects of the invention are to provide an oil bolt which has maximum oil holding capacity; which automatically feeds the oil to the surfaces to be lubricated; which retards the flow of oil so as to supply only what is required for perfect lubrication and therefore conserves the oil supply; which is easily filled without removing any of its parts or taking out the bolt itself; which prevents the entrance of dirt or foreign substances to the bearing; which does not interfere in any way with the functions of the bolt as a holding member or prevent its manipulation or operation in the usual way; and finally a bolt of this kind which can be manufactured at low cost without special tools and in any desired size or form.

Further objects of the invention are in part obvious and in part will appear more in detail hereinafter.

Figure 1:
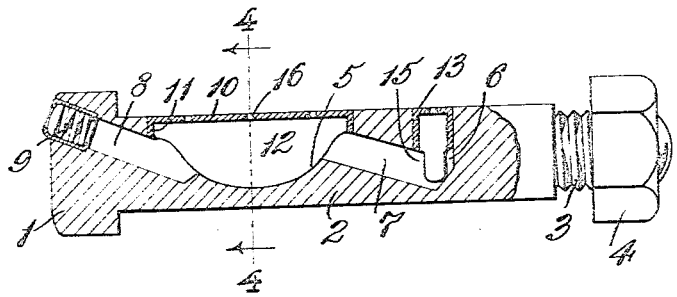
Figure 3:
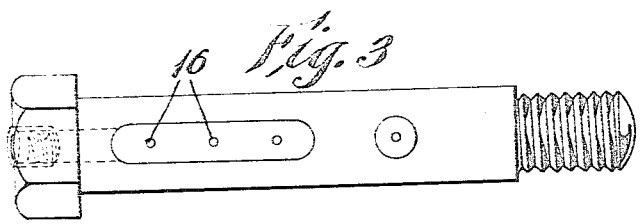
Figure 2:
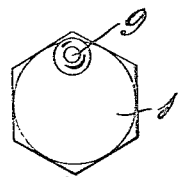
Figure 4:
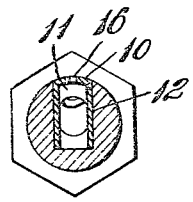
Figure 5:
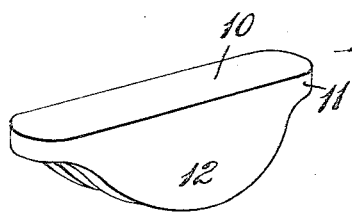
Figure 6:
Figure 7:
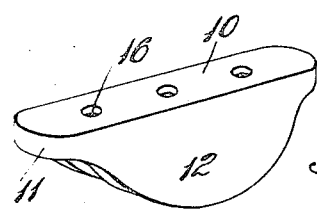
Figure 8:
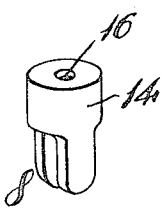
Figure 9:
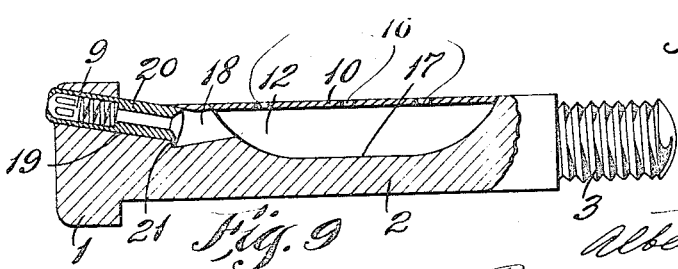

In the drawings, Figure 1 is a longitudinal sectional view of one form of bolt; Fig. 2 is an end view; Fig. 3 is a plan view; Fig. 4 is a cross section on the line 4—4, Fig. 1; Fig. 5 is a perspective view of a modified form of diaphragm or cover; Fig. 6 is a similar view of another diaphragm or cover; Figs. 7 and 8 are similar views illustrating the diaphragms or covers shown in Fig. 1; and Fig. 9 is a longitudinal section, showing another form of the invention.

Referring to the drawings the bolt shown comprises the usual head 1 and shank 2 which may be of any suitable or desired form, size or design. The head shown is of hexagonal form, while the shank is threaded at 3 to receive the usual nut 4. The body or shank of the bolt is provided with a chamber serving as a reservoir for the oil, said chamber being of comparatively large size as compared with the cross sectional area of the bolt but not so large as to weaken it from a mechanical standpoint. This chamber may be formed by one or several connected cavities. In Fig. 1 the chamber comprises a large cavity 5 and a smaller cavity 6 both opening outwardly through the side surface of the shank. Cavity 6 may be made by drilling into the shank while cavity 5 is of material length and may be made by milling or slotting out the side of the shank. The length of cavity 5 enables a drilling tool to be run into the shank along a diagonal line to form a passage 7 connecting the two cavities to insure a free flow of oil from one to the other.

The lubricating oil is supplied to the reservoir through a suitable filling passage 8 which, in Fig. 1, is shown as an opening bored into the bolt from the head end, said passage being countersunk at its outer end to receive a yielding closing valve device 9 accessible at the end of the bolt. By pressing this valve inwardly with the oil can spout oil may be introduced into the reservoir when required, as will be readily understood. By locating the filling valve on the end surface of the bolt it is not so liable to collect dirt as when it is on the side of the bolt head.

The oil reservoir is closed by a cover which prevents the oil from rapidly wasting away but at the same time is so formed or constructed as to permit a slight flow or escape of oil for lubricating purposes. This cover, for the cavity 5, is of inverted shallow tray form with a transverse body portion 10 and a surrounding rim 11, the side walls 12 of which are extended downwardly so that the cover is of channel or U-form in cross section. It is formed to closely fit the walls of the cavity 5 and is pressed into said cavity from the outside so as to leave the body 10 exposed along the surface of the bolt. The cavity 6 has a similar cover 13 in the form of a thimble with its side wall 14 slotted out at 15 to allow the oil to pass into the cavity.

The covers for the oil cavity may be made of any suitable thin material. Other things being equal the thinner they are, the better, because the capacity of the reservoir is thereby increased. They may be made of thin sheet metal, preferably resilient, being held in the cavities by their own springiness. In such case each cover is provided with one or more fine openings or ports 16 through which the oil splashes or works its way out to the surfaces to be lubricated. Preferably, however, the covers are made of a suitable porous or pervious material which may be a fibrous, textile or other substance. A cellulose composition, such as paper board is one material suitable for the purpose, while even cloth, leather or the like may be used.

This material may be provided with small ports or openings such as those described in connection with the metal covers, in which case the oil will splash out, as before. The ports are, however, unnecessary as the fibrous composition of the diaphragm produces an osmotic action, the oil working its way slowly through the diaphragm as needed. The extended side walls of the covers then serve to feed the oil by capillary attraction to the diaphragm so that the last remnant of oil in the reservoir will discharge to the surface to be lubricated. The side walls of the fiber covers or diaphragms are preferably coated with water glass, shellac or any other suitable adhesive before insertion to hold them securely in place in their seats, although this is not essential.

Fig. 9 shows another embodiment of the invention in which the reservoir comprises but a single cavity 17 whose feeding channel includes a passage 18 drilled out on a diagonal line from the cavity 17 and a passage 19 drilled from the head end of the bolt. This latter passage is drilled across the angle between the bolt head and shank so as to there expose a portion of the tube 20 of the filling valve member. This tube therefore serves as a key to prevent the bolt from turning in the part to which it is attached, it being of course understood that said part will be provided with a shallow notch at the edge of the opening therein to receive the keying tube. The tube can be locked in its channel by punching down its edge, as at 21.

Various other modifications will readily occur to those skilled in the art and it is to be understood that the invention is not limited to the precise forms shown but includes all changes and variations within the scope of the claims appended hereto.

The bolt described is easy to fill, can be made at low cost, and produces a continuous automatic flow of oil to the parts to be lubricated.

What I claim is:—

1. An oil bolt, comprising a bolt body having one side slotted to form an open cavity serving as an oil reservoir, a pervious thin walled fiber diagram covering said cavity, and means whereby oil may be supplied to said cavity.

2. An oil bolt, comprising a bolt body having a longitudinal slot in one side forming a cavity having a mouth open at one side of the body, and a cover for said cavity formed of pervious material and arranged to slowly deliver oil therefrom, said body being provided with an oil filling channel communicating with said cavity and a portion of which is cylindrical, the axis of said cylindrical portion passing through said mouth.

3. An oil bolt body having a head and shank, said shank having a cavity forming an oil reservoir having a mouth opening out through the side of said shank, and a cover for said opening formed of a thin sheet of pervious material, said bolt also having a filling channel for said cavity extending through the bolt head and having a cylindrical portion whose axis passes through said mouth.

4. An oil bolt, comprising a bolt body having a head and shank, said shank having a cavity forming an oil reservoir opening out through the side of said shank, a pervious cover for said opening, said bolt also having a filling channel for said cavity extending through the bolt head, and a valve device closing said channel and extending across the angle between said head and shank and thereby serving as a key.

5. An oil bolt, comprising a bolt body having a side slot forming an oil reservoir, means whereby oil may be supplied to said reservoir, and a hollow inverted rimmed diagram covering said slot.

6. An oil bolt, comprising a bolt body having a side slot forming an oil reservoir, means whereby oil may be supplied to said reservoir, and a hollow inverted rimmed diaphragm covering said slot, said diaphragm being formed of fibrous material.

7. An oil bolt, comprising a bolt body having a side slot forming an oil reservoir, means whereby oil may be supplied to said reservoir, and a hollow inverted rimmed diaphragm covering said slot, said diaphragm having a plurality of small oil ports therethrough.

8. An oil bolt, comprising a bolt body having a side slot forming an oil reservoir, means whereby oil may be supplied to said reservoir, and a hollow inverted rimmed diaphragm covering said slot, said diaphragm having a plurality of small oil ports therethrough and being formed of fibrous material.

In testimony whereof I affix my signature.

ALBERT D. RAY.